United States Patent
Zhang et al.

(10) Patent No.: US 11,148,644 B2
(45) Date of Patent: Oct. 19, 2021

(54) BATTERY SWAPPING SYSTEM

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Jianping Zhang, Shanghai (CN); Chunhua Huang, Shanghai (CN); Zhihao Chen, Shanghai (CN); Weichun Huang, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 0 days.

(21) Appl. No.: 16/770,242

(22) PCT Filed: Dec. 7, 2018

(86) PCT No.: PCT/CN2018/119717
§ 371 (c)(1),
(2) Date: Sep. 28, 2020

(87) PCT Pub. No.: WO2019/109996
PCT Pub. Date: Jun. 13, 2019

(65) Prior Publication Data
US 2021/0009089 A1    Jan. 14, 2021

(30) Foreign Application Priority Data
Dec. 8, 2017 (CN) .......................... 201711295369.X

(51) Int. Cl.
*B60S 5/06* (2019.01)
*B60L 53/80* (2019.01)

(52) U.S. Cl.
CPC ................. *B60S 5/06* (2013.01); *B60L 53/80* (2019.02)

(58) Field of Classification Search
CPC ................................. B60S 5/06; B60L 53/80
See application file for complete search history.

(56) References Cited

U.S. PATENT DOCUMENTS

2012/0326107 A1    12/2012   Ojima et al.
2013/0140099 A1*   6/2013   Ojima ................... H01M 50/20
                                                       180/65.1

(Continued)

FOREIGN PATENT DOCUMENTS

CN          105186052 A      12/2015
CN          205034089 U       2/2016

(Continued)

OTHER PUBLICATIONS

Search Report issued in International Patent Application No. PCT/CN2018/119717 dated Mar. 4, 2019.

(Continued)

*Primary Examiner* — David V Henze-Gongola

(57) ABSTRACT

Disclosed is a battery swapping system, comprising a battery swapping device, a signal transmission unit, a position sensor, and a detection section. The battery swapping device comprises a master control unit and a battery pack disassembly and assembly unit. The battery pack disassembly and assembly unit is used for clamping the battery pack, the master control unit is used for controlling the battery pack disassembly and assembly unit to move along a preset path. The position sensor is used for generating a stopping instruction upon sensing of the detection section, sending the stopping instruction to the master control unit which is used (Continued)

for stopping moving the battery pack disassembly and assembly unit according to the stopping instruction. According to the present invention, whether a battery pack is mounted in place can be accurately detected, the accuracy and safety of battery pack swapping is ensured and the costs are low.

12 Claims, 3 Drawing Sheets

(56) References Cited

U.S. PATENT DOCUMENTS

2016/0368464 A1 12/2016 Hassounah
2020/0091744 A1* 3/2020 Vain .................. B60L 53/65

FOREIGN PATENT DOCUMENTS

| CN | 205149818 U | 4/2016 |
|----|-------------|--------|
| CN | 106218599 A | 12/2016 |
| CN | 206067520 U | 4/2017 |
| CN | 109895750 A | 6/2019 |
| EP | 3722164 A1 | 10/2020 |
| JP | 2013006568 A | 1/2013 |
| JP | 2017003467 A | 1/2017 |

OTHER PUBLICATIONS

Written Opinion of the International Searching Authority issued in International Patent Application No. PCT/CN2018/119717 dated Mar. 4, 2019.
Mar. 3, 2021 First Office Action issued in Chinese Patent Application No. 201711295369.X.
Jul. 26, 2021 Korean Office Action issued in Korean Application No. 10-2020-7019658.

* cited by examiner

BATTERY SWAPPING SYSTEM

The present application is a. National Stage of International Application No. PCT/CN2018/119717, filed on Dec. 7, 2018, which claims the priority of the Chinese patent application No. CN2017/11295369.X, filed on Dec. 8, 2017, the contents of which are incorporated herein by reference in their entireties.

FIELD OF INVENTION

The present invention belongs to the technical field of battery swapping for electric vehicles, and particularly to a battery swapping system.

PRIOR ARTS

In the battery swapping process of an electric vehicle, it must be ensured that a control signal is correctly transmitted to a battery swapping apparatus, such that the battery swapping apparatus succeeds in battery swapping through closed-loop control. Whether a battery pack is mounted in place is the key to the success of the battery swapping. The battery pack is generally arranged at the bottom of the electric vehicle. In the prior art, battery packs are mostly manually swapped, which has a low mounting efficiency and increases the waiting time of users; moreover, when an operator installs a battery pack at the bottom of the vehicle, there exist safety concerns; in addition, the battery pack is lifted unstably when manually mounted due to its large weight, which makes it prone to cause inaccurate and out-of-place mounting.

Content of the Present Invention

The technical problem to be solved by the present invention is to provide a low-cost and high-accurate battery swapping system for detecting whether a battery pack is mounted in place, in order to overcome the defects of inaccurate and out-of-place mounting of a battery pack when swapping a battery pack for an electric vehicle in the prior art.

The present invention solves the above-mentioned technical problem by the following technical solution:

a battery swapping system, comprising a battery swapping device, a signal transmission unit, a position sensor mounted on a quick swapping support of an electric vehicle, and a detection section mounted on a battery pack, characterized in the battery swapping device comprises a master control unit and a battery pack disassembly and assembly unit, the battery pack disassembly and assembly unit is used for swapping the battery pack on the electric vehicle, and the master control unit is used for controlling the battery pack disassembly and assembly unit to move along a preset path;

the position sensor is used for sensing the detection section, generating a stopping instruction upon sensing of the detection section, and sending the stopping instruction to the master control unit by means of the signal transmission unit; and the master control unit is used for stopping moving the battery pack disassembly and assembly unit according to the stopping instruction.

Preferably, the position sensor comprises a magnetic field sensor, and the detection section comprises a magnetic steel, the magnetic field sensor is used for sensing the magnetic field of the magnetic steel.

Preferably, the magnetic field sensor comprises a Hall sensor.

Preferably, there are at least two magnetic field sensors, which sense the magnetic field of the magnetic steel at different positions.

Preferably, the signal transmission unit comprises a primary transmission head provided on the battery swapping device and a secondary transmission head provided on the quick swapping support of the electric vehicle, the primary transmission head being communicatively connected to the secondary transmission head, the primary transmission head being electrically connected to the master control unit, and the secondary transmission head being communicatively connected to the magnetic field sensor.

Preferably, the signal transmission unit further comprises a secondary module; the magnetic field sensor is a Hall sensor; and the secondary module is electrically connected to the secondary transmission head, and the secondary module is used for acquiring a Hall signal generated by the Hall sensor and converting the Hall signal into a digital signal, and the stopping instruction is generated according to the digital signal and transmitted to the secondary transmission head.

Preferably, the secondary module is used for acquiring electric energy from the primary transmission head by means of the secondary transmission head, and is used for supplying power to the magnetic field sensor.

Preferably, the primary transmission head is mounted on a bracket which is provided with a spring, and the primary transmission head moves, relative to the bracket, in an extending and retracting direction of the spring.

Preferably, the bracket comprises a mounting plate, a guide shaft, and a support unit;

an end portion of the primary transmission head is fixed to the mounting plate, and an extending portion of the primary transmission head passes through the support unit; and one end of the guide shaft is fixed to the mounting plate and the other end thereof passes through the support unit, the spring is sleeved outside the guide shaft, and one end of the spring is connected to the mounting plate and the other end thereof is connected to the support unit.

Preferably, the magnetic steel is mounted in a lock shaft of the battery pack.

Preferably, the stopping instruction is a low-level signal.

The present invention has the following positive improvement effects: according to the battery swapping system of the present invention, it can be accurately detected whether a battery pack is mounted in place, which ensures the accuracy and safety of battery pack swapping and has a low cost.

DETAILED DESCRIPTION OF THE PREFERRED EMBODIMENT

The present invention is further described below by means of embodiments, but the present invention is not therefore limited within the scope of the embodiments.

Embodiment 1

Figure 1:
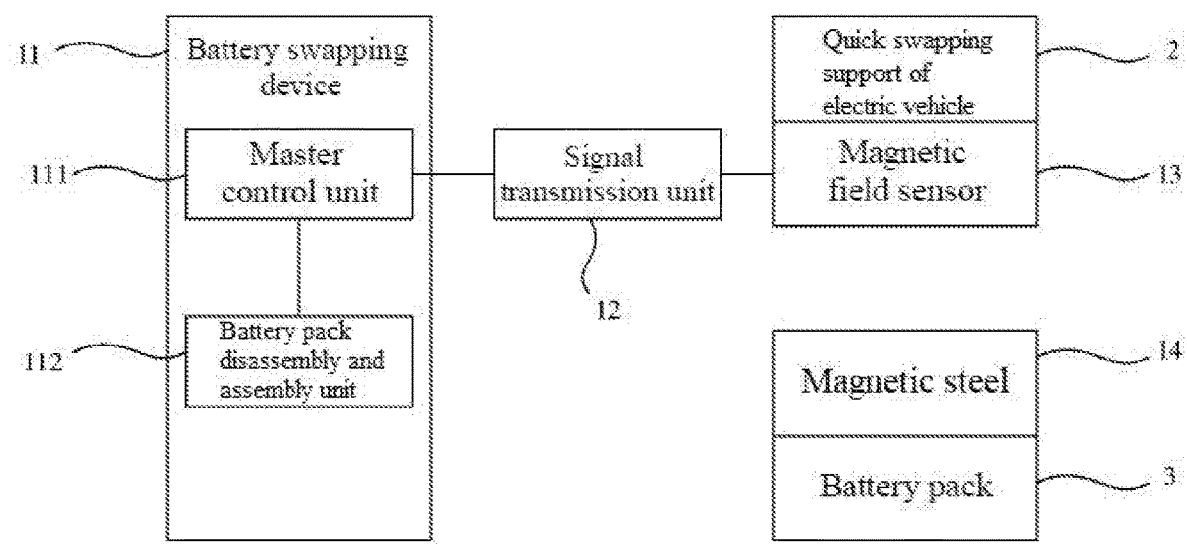
FIG. 1 is a schematic structural diagram of a battery swapping system of Embodiment 1 of the present invention.

As shown in FIG. 1, the battery swapping system in this embodiment comprises a battery swapping device 11, a signal transmission unit 12, a position sensor mounted on a quick swapping support 2 of an electric vehicle, and a detection section mounted on a battery pack 3. The battery swapping device 11 comprises a master control unit 111 and a battery pack disassembly and assembly unit 112, the battery pack disassembly and assembly unit 112 is used for clamping the battery pack 3, and the master control unit 111 is used for controlling the battery pack disassembly and assembly unit 112 to move along a preset path; the position sensor is used for sensing the detection section, generating a stopping instruction upon sensing of the detection section, and sending the stopping instruction to the master control unit by means of the signal transmission unit; and the master control unit is used for stopping moving the battery pack disassembly and assembly unit according to the stopping instruction. The position sensor comprises, but is not limited to, a magnetic field sensor 13 shown in FIG. 1, and the detection section comprises, but is not limited to, a magnetic steel 14 shown in FIG. 1. The magnetic field sensor 13 is used for sensing the magnetic field of the magnetic steel 14, generating a stopping instruction upon sensing of the magnetic field of the magnetic steel 14, and sending the stopping instruction to the master control unit 111 by means of the signal transmission unit 12. The master control unit 111 is used for stopping moving the battery pack disassembly and assembly unit 112 according to the stopping instruction.

In other embodiments of the battery swapping system of the present invention, the position sensor may be one of a capacitive proximity sensor, an inductive proximity sensor, or a photoelectric proximity sensor which is used in combination with the detection section. When the position sensor detects that the detection section has reached a preset position, namely, indicating that the battery pack has reached the preset position, the position sensor generates a stopping instruction and sends the stopping instruction to the master control unit by means of the signal transmission unit.

When the battery swapping system in this embodiment is used, the master control unit 111 controls the battery pack disassembly and assembly unit 112 to dismount a battery pack to be swapped from the quick swapping support 2 of the electric vehicle. The battery pack disassembly and assembly unit 112 comprises a mechanical gripper for clamping and moving the battery pack. By taking the case where the quick swapping support is arranged at a lower part of the electric vehicle as an example, the master control unit 111 controls the battery pack disassembly and assembly unit 112 to clamp a battery pack to be swapped from the lower part of the electric vehicle, dismount the battery pack to be swapped, and clamps and moves the battery pack to be swapped vertically downward, and then, the battery pack disassembly and assembly unit 112 clamps and moves the battery pack to be swapped horizontally out of the bottom of the electric vehicle. Next, the battery pack disassembly and assembly unit 112 delivers the battery pack to be swapped to a charging device for charging.

After the charging is completed, the battery pack disassembly and assembly unit 112 moves the charged battery pack to the bottom of the electric vehicle, and then lifts same upward after aligning the charged battery pack with a battery pack mounting groove on the quick swapping support of the electric vehicle. The magnetic field sensor 13 mounted on the quick swapping support 2 of the electric vehicle senses the magnetic field which is generated by the magnetic steel 14 arranged on the charged battery pack. When no magnetic field is sensed by the magnetic field sensor 13 or the intensity of the sensed magnetic field does not reach a preset intensity value, it is considered that the battery pack 3 has not moved into the battery pack mounting groove, and the battery pack disassembly and assembly unit 112 continues to lift the battery pack 3 upward. When the intensity of the magnetic field sensed by the magnetic field sensor 13 reaches the preset intensity value, it is considered that the battery pack 3 has moved into the battery pack mounting groove, and the magnetic field sensor 13 generates a stopping instruction and sends the stopping instruction to the master control unit 111 by means of the signal transmission unit 12; and the master control unit 111 stops the movement of the battery pack disassembly and assembly unit 112 according to the stopping instruction. The battery pack 3 is snapped into the battery pack mounting groove, and the battery pack disassembly and assembly unit 112 is withdrawn. As such, a battery swapping operation is completed.

The magnetic field sensor 13 in this embodiment comprises, but is not limited to, a Hall sensor. The preset intensity value of the magnetic field can be set according to the magnetic field characteristics of the selected magnetic steel, the structure of the quick swapping support, and test data in practical applications.

The battery swapping device in this embodiment is used with a high efficiency, and avoids the safety concerns of an operator dismounting and mounting the battery pack at the bottom of the electric vehicle; in addition, it can be accurately determined whether the battery pack is mounted in place, which improves the accuracy of battery pack mounting.

Embodiment 2

The battery swapping system in this embodiment is substantially the same as the battery swapping system of Embodiment 1 in structure, except that: in the battery swapping system in this embodiment, there are at least two magnetic field sensors 13, and these magnetic field sensors 13 sense the magnetic field of the magnetic steel 14 at different positions. For example, one of the magnetic field sensors 13 is arranged on the bottom surface of the quick swapping support 2 of the electric vehicle, and is used for sensing the magnetic field of the magnetic steel 14 in a longitudinal direction and for determining whether the battery pack 3 is moved and mounted in place in the longitudinal direction; and another magnetic field sensor 13 is arranged on a side wall, near the head of the electric vehicle, of the quick swapping support 2 of the electric vehicle, and is used for determining whether the battery pack 3 is moved and mounted in place in a transverse direction. Further, the magnetic steel 14 is mounted in a lock shaft of the battery pack 3.

When the battery swapping system in this embodiment is used, the master control unit 111 controls the battery pack disassembly and assembly unit 112 to clamp a battery pack to be swapped from the lower part of the electric vehicle, dismount the battery pack to be swapped, and clamps and moves the battery pack to be swapped vertically downward, and then, the battery pack disassembly and assembly unit 112 clamps and moves the battery pack to be swapped horizontally out of the bottom of the electric vehicle. Next, the battery pack disassembly and assembly unit 112 delivers the battery pack to be swapped to a charging device for charging.

After the charging is completed, the battery pack disassembly and assembly unit 112 moves the charged battery pack to the bottom of the electric vehicle, and then lifts same upward after aligning the charged battery pack with a battery pack mounting groove on the quick swapping support of the electric vehicle. The magnetic field sensor 13 mounted on the quick swapping support 2 of the electric vehicle senses the magnetic field which is generated by the magnetic steel 14 arranged on the charged battery pack. When no magnetic field is sensed by the magnetic field sensor 13 or the intensity of the sensed magnetic field does not reach a preset intensity value, it is considered that the battery pack 3 has not moved into the battery pack mounting groove in a longitudinal direction, and the battery pack disassembly and assembly unit 112 continues to lift the battery pack 3 upward. When the intensity of the magnetic field sensed by the magnetic field sensor 13 reaches the preset intensity value, it is considered that the battery pack 3 has moved into the battery pack mounting groove in a longitudinal direction, and the magnetic field sensor 13 generates a stopping instruction (which is an instruction for stopping upward-movement) and sends the stopping instruction to the master control unit 111 by means of the signal transmission unit 12; and the master control unit 111 stops the upward-movement of the battery pack disassembly and assembly unit 112 according to the stopping instruction. Then, the master control unit 111 controls the battery pack disassembly and assembly unit 112 to push the battery pack 3 toward the head of the electric vehicle along a preset path such that the battery pack is inserted into the battery pack mounting groove. In this case, the magnetic field sensor 13 arranged on the side wall, near the head of the electric vehicle, of the quick swapping support 2 of the electric vehicle (that is, the bottom end of the battery pack mounting groove) senses the magnetic field generated by the magnetic steel 14. When the intensity of the magnetic field sensed by the magnetic field sensor 13 reaches the preset intensity value, it is considered that the battery pack 3 is moved and mounted in place in a transverse direction (a length direction of the vehicle body). The magnetic field sensor 13 generates a stopping instruction and sends the stopping instruction to the master control unit 111 by means of the signal transmission unit 12; and the master control unit 111 stops the movement of the battery pack disassembly and assembly unit 112 according to the stopping instruction. The battery pack 3 is snapped into the battery pack mounting groove, a power output pin of the battery pack is accurately connected to a power input pin of the electric vehicle, and the battery pack disassembly and assembly unit 112 is withdrawn. As such, a battery swapping operation is completed.

In order to improve the stability of signal transmission and logic control, the stopping instruction is a low-level signal.

Further, the quick swapping support 2 of the electric vehicle is also provided with a magnetic field sensor 13 on the side wall thereof in a width direction of the vehicle body of the electric vehicle, which is used to determine whether the battery pack 3 has moved in place in the width direction of the vehicle body of the electric vehicle, so as to guide the master control unit 111 to move the battery pack disassembly and assembly unit 112 to adjust the position of the battery pack 3 in the width direction of the vehicle body of the electric vehicle.

By means of the battery swapping system in this embodiment, the accuracy of a battery swapping operation is further improved, and in a battery swapping process, the mounting of the battery pack is more accurate, and the power output pin of the battery pack and the power input pin of the electric vehicle can be accurately connected.

Embodiment 3

Figure 2:
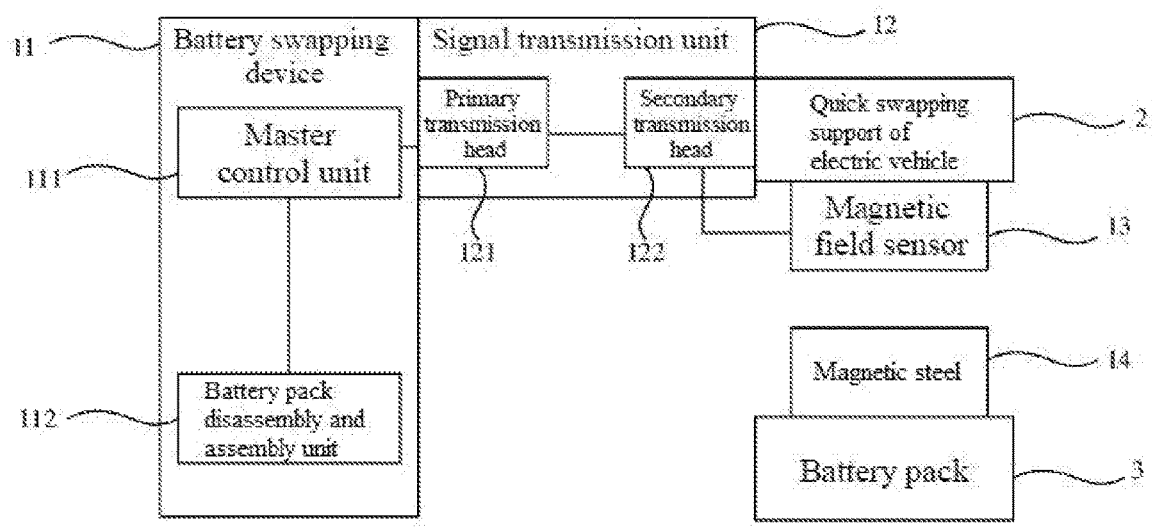
FIG. 2 is a schematic structural diagram of a battery swapping system of Embodiment 3 of the present invention.

The battery swapping system in this embodiment is substantially the same as the battery swapping system of Embodiment 1 in structure. On the basis of the battery swapping system of Embodiment 1, as shown in FIG. 2, the signal transmission unit 12 of the battery swapping system in this embodiment comprises a primary transmission head 121 arranged on the battery swapping device 11 and a secondary transmission head 122 arranged on the quick swapping support 2 of the electric vehicle. The primary transmission head 121 is communicatively connected to the secondary transmission head 122. The primary transmission head 121 is electrically connected to the master control unit 111. The secondary transmission head 122 is communicatively connected to the magnetic field sensor 13.

When the battery swapping system in this embodiment is used, data communication between the master control unit 111 and the magnetic field sensor 13 can be realized through data transmission between the primary transmission head 121 and the secondary transmission head 122.

Figure 3:
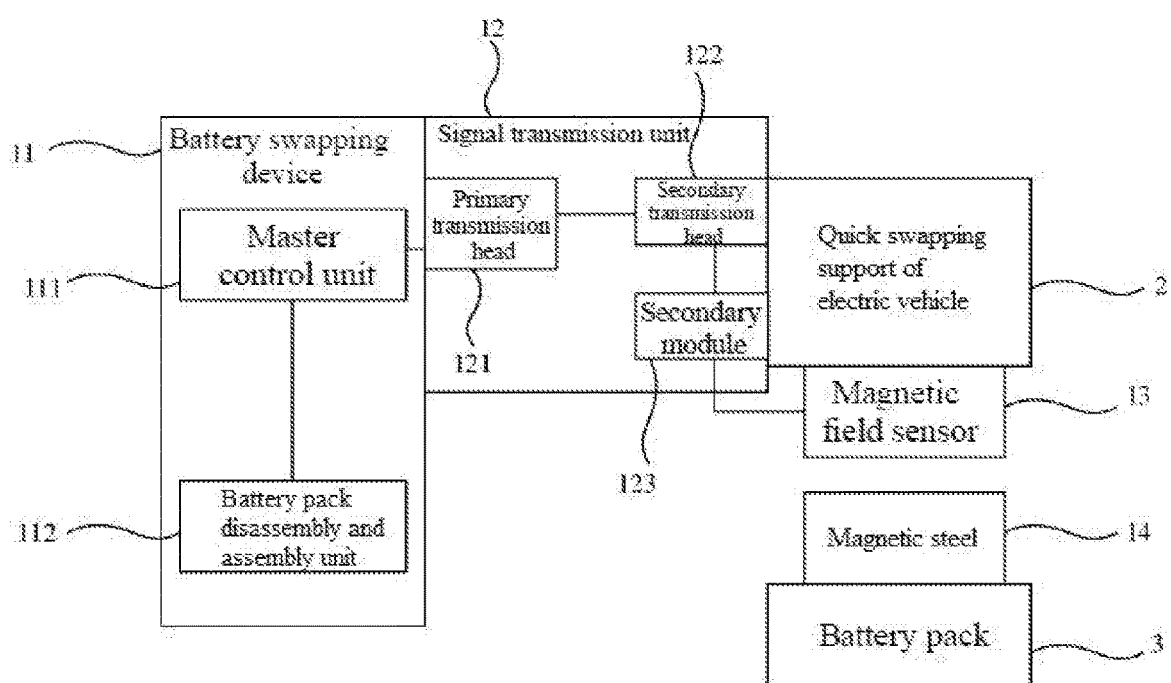
FIG. 3 is a schematic structural diagram of another optional embodiment of the battery swapping system of Embodiment 3 of the present invention.

Further, as shown in FIG. 3, the signal transmission unit 12 further comprises a secondary module 123; and the magnetic field sensor 13 is a Hall sensor. The secondary module 123 is electrically connected to the secondary transmission head 122, and the secondary module 123 is used for acquiring a Hall signal (that is, a signal representing the intensity of the magnetic field sensed by the Hall sensor) generated by the Hall sensor and converting the Hall signal into a digital signal, and when the digital signal reaches a preset intensity value, the Hall sensor generates a stopping instruction and transmits the stopping instruction to the secondary transmission head 122. The secondary transmission head 122 transmits the stopping instruction to the master control unit 111 by means of the primary transmission head 121. The secondary transmission head, the secondary module, and the magnetic field sensor acquire electric energy from the vehicle body of the electric vehicle for operating.

In order to separate a circuit of the battery swapping system from a circuit of the vehicle body of the electric vehicle, the signal transmission unit 12 is also used for transmitting electric energy in another embodiment, in addition to signal transmission. In specific implementation, as shown in FIG. 3, the secondary module 123 acquires electric energy from the primary transmission head 121 by means of the secondary transmission head 122 (the primary transmission head 121 acquires electric energy from the battery swapping device 11), and is used for supplying power to the magnetic field sensor 13. In this case, the battery swapping system in this embodiment acquires electric energy from the battery swapping device 11 without acquiring electric energy from the electric vehicle, so that the circuit of the battery swapping system and the circuit of the vehicle body of the electric vehicle are separated and do not interfere with each other during operating, which avoids conflicts between the circuit of the battery swapping system and the circuit of the vehicle body of the electric vehicle, and improves the reliability of the battery swapping operation.

Figure 4:
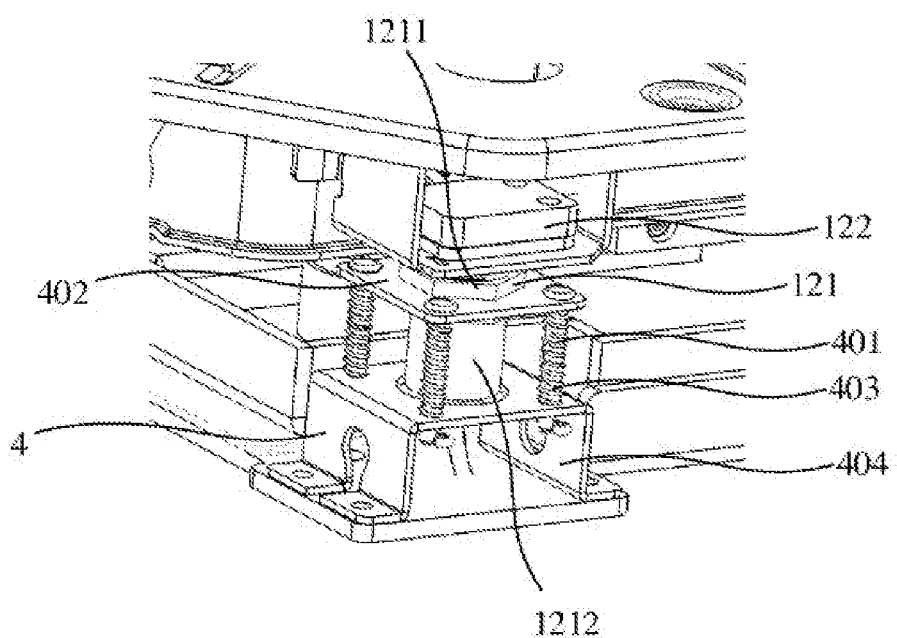
FIG. 4 is a three-dimensional partial schematic structural diagram of the battery swapping system of Embodiment 3 of the present invention.

In order to ensure a reliable contact between the primary transmission head 121 and the secondary transmission head 122 (for example, the end faces of the primary transmission head 121 and the secondary transmission head 122 are aligned, and there may be a distance of 0 to 5 millimeters between the two for transmission of data and electric energy through wireless communication), as shown in FIG. 4, the primary transmission head 121 is mounted on a bracket 4 provided with a spring 401, and the primary transmission head 121 moves, relative to the bracket 4, in an extending and retracting direction of the spring 401. In this way, a buffer can be formed when the primary transmission head 121 and the secondary transmission head 122 are in contact, to avoid damages caused by excessive pressure between the primary transmission head 121 and the secondary transmission head 122.

Specifically, as shown in FIG. 4, the bracket 4 comprises a mounting plate 402, a guide shaft 403, and a support unit 404. An end portion 1211 of the primary transmission head 121 is fixed to the mounting plate 402, and an extending portion 1212 of the primary transmission head 121 passes through the support unit 404; and one end of the guide shaft 403 is fixed to the mounting plate 402 and the other end thereof passes through the support unit 404, the spring 401 is sleeved outside the guide shaft 403, and one end of the spring 401 is connected to the mounting plate 402 and the other end thereof is connected to the support unit 404. When the end portion 1211 of the primary transmission head 121 is subjected to pressure, the mounting plate 402 compresses the spring 401 and moves in an axial direction of the guide shaft 403 (that is, an extending and retracting direction of the spring 401); and the other end of the guide shaft 403 passes through the support unit 404 and moves downward relative to the support unit 404, and the extending portion 1212 of the primary transmission head 121 passes through the support unit 404 and moves downward relative to the support unit 404. The structure can allow the primary transmission head 121 to flexibly contract when subjected to pressure, thereby providing a better protection.

Although the specific embodiments of the present invention have been described above, it will be understood by those skilled in the art that these are merely illustrative, and that various alterations or modifications can be made to these embodiments without departing from the principle and essence of the present invention. Therefore, the scope of protection of the present invention is defined by the appended claims.

What is claimed is:

1. A battery swapping system, characterized in that the battery swapping system comprising a battery swapping device, a signal transmission unit, a position sensor mounted on a quick swapping support of an electric vehicle, and a detection section mounted on a battery pack,
the battery swapping device comprises a master control unit and a battery pack disassembly and assembly unit,
the battery pack disassembly and assembly unit is used for swapping the battery pack on the electric vehicle, and
the master control unit is used for controlling the battery pack disassembly and assembly unit to move along a preset path;
the position sensor is used for sensing the detection section, generating a stopping instruction upon sensing of the detection section, and sending the stopping instruction to the master control unit by means of the signal transmission unit; and the master control unit is used for stopping moving the battery pack disassembly and assembly unit according to the stopping instruction;
the position sensor comprises a magnetic field sensor, and the detection section comprises a magnetic steel, the magnetic field sensor is used for sensing the magnetic field of the magnetic steel;
the signal transmission unit comprises a primary transmission head provided on the battery swapping device and a secondary transmission head provided on the quick swapping support of the electric vehicle,
the primary transmission head being communicatively connected to the secondary transmission head, the primary transmission head being electrically connected to the master control unit, and
the secondary transmission head being communicatively connected to the magnetic field sensor.

2. The battery swapping system of claim 1, characterized in that the magnetic field sensor comprises a Hall sensor.

3. The battery swapping system of claim 1, characterized in that there are at least two magnetic field sensors, which sense the magnetic field of the magnetic steel at different positions.

4. The battery swapping system of claim 1, characterized in that the signal transmission unit further comprises a secondary module; the magnetic field sensor is a Hall sensor; and
the secondary module is electrically connected to the secondary transmission head, and the secondary module is used for acquiring a Hall signal generated by the Hall sensor and converting the Hall signal into a digital signal, and the stopping instruction is generated according to the digital signal and transmitted to the secondary transmission head.

5. The battery swapping system of claim 3, characterized in that the secondary module is used for acquiring electric energy from the primary transmission head by means of the secondary transmission head, and is used for supplying power to the magnetic field sensor.

6. The battery swapping system of claim 1, characterized in that the primary transmission head is mounted on a bracket which is provided with a spring, and
the primary transmission head moves, relative to the bracket, in an extending and retracting direction of the spring.

7. The battery swapping system of claim 4, characterized in that the bracket comprises a mounting plate, a guide shaft, and a support unit;
an end portion of the primary transmission head is fixed to the mounting plate, and an extending portion of the primary transmission head passes through the support unit; and one end of the guide shaft is fixed to the mounting plate and the other end thereof passes through the support unit, the spring is sleeved outside the guide shaft, and one end of the spring is connected to the mounting plate and the other end thereof is connected to the support unit.

8. The battery swapping system of claim 1, characterized in that the magnetic steel is mounted in a lock shaft of the battery pack.

9. The battery swapping system of claim 1, characterized in that the stopping instruction is a low-level signal.

10. The battery swapping system of claim 1, characterized in that the position sensor comprises at least one of a capacitive proximity sensor, an inductive proximity sensor, and a photoelectric proximity sensor.

11. The battery swapping system of claim 1, characterized in that the battery pack disassembly and assembly unit comprises a mechanical gripper.

12. The battery swapping system of claim 2, characterized in that the magnetic field sensor is arranged on a bottom surface of the quick swapping support and/or a side wall of the quick swapping support.

\* \* \* \* \*